(12) United States Patent
Dom et al.

(10) Patent No.: US 6,584,456 B1
(45) Date of Patent: Jun. 24, 2003

(54) MODEL SELECTION IN MACHINE LEARNING WITH APPLICATIONS TO DOCUMENT CLUSTERING

(75) Inventors: Byron Edward Dom, Los Gatos, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 09/597,913

(22) Filed: Jun. 19, 2000

(51) Int. Cl.[7] .......................... G06F 17/00; G06N 5/00
(52) U.S. Cl. .......................... 706/45; 707/100
(58) Field of Search .................... 706/14, 45, 12; 707/100

(56) References Cited

U.S. PATENT DOCUMENTS

| | | | |
|---|---|---|---|
| 5,442,778 A | 8/1995 | Pedersen et al. ............... 707/5 |
| 5,483,650 A | 1/1996 | Pedersen et al. ............... 707/2 |
| 5,625,767 A | 4/1997 | Bartell et al. ............... 345/440 |
| 5,787,420 A | 7/1998 | Tukey et al. ............... 707/5 |
| 5,787,422 A | 7/1998 | Tukey et al. ............... 707/5 |
| 5,808,615 A | 9/1998 | Hill et al. ............... 345/356 |
| 5,819,258 A | 10/1998 | Vaithyanathan ............... 702/2 |
| 5,844,991 A | 12/1998 | Hochberg et al. ............... 382/218 |
| 5,857,179 A | 1/1999 | Vaithyanathan ............... 707/2 |
| 5,864,855 A | 1/1999 | Ruocco et al. ............... 707/10 |
| 5,873,056 A | 2/1999 | Liddy et al. ............... 704/9 |

OTHER PUBLICATIONS

A. K. Jain; Data Clustering: A Review; Sep. 1999; ACM; Computing Surveys, vol. 31, No. 3; 264–323.*

* cited by examiner

*Primary Examiner*—John Follansbee
*Assistant Examiner*—Joseph P. Hirl
(74) *Attorney, Agent, or Firm*—Lacasse & Associates, LLC; Randy W. Lacasse; Khanh Q. Tran, Esq.

(57) ABSTRACT

A objective function based on a Bayesian statistical estimation framework is used to determine an optimal model selection by choosing both the optimal number of clusters and the optimal feature set. Heuristics can be applied to find the optimal (or at least sub-optimal) of this objective function in terms of the feature sets and the number of clusters, wherein the maximization of the objective function corresponds to the optimal model structure.

18 Claims, 2 Drawing Sheets

108

COMPUTE NUMBER OF DOCUMENTS WHICH EACH TOKEN APPEARS IN
202

PERFORM DISTRIBUTION CLUSTERING USING RELATIVE ENTROPY DISTANCE MEASURE INTO K CLUSTERS
204

FIGURE 2

MODEL SELECTION IN MACHINE LEARNING WITH APPLICATIONS TO DOCUMENT CLUSTERING

BACKGROUND OF THE INVENTION

1. Field of Invention

The present invention relates generally to the field of data clustering. More specifically, the present invention is related to model selection for improving document clustering.

2. Discussion of Prior Art

Unsupervised learning is an attempt to determine the intrinsic structure in data and is often viewed as finding clusters in a data set. Clustering is an important tool in the analysis of data with applications in several domains such as psychology, humanities, clinical diagnosis, pattern recognition, information retrieval, etc. Model selection in clustering, that is, how to determine adjustments to a number of model parameters, has proven to be particularly challenging. Therefore, there is clearly a need for a system that performs clustering in different feature spaces.

The following references describe prior art in the field of data clustering. The prior art described below does not however relate to the present invention's method of model selection via a unified objective function whose arguments include the feature space and number of clusters.

U.S. Pat. No. 5,819,258 discloses a method and apparatus for automatically generating hierarchal categories from large document collections. Vaithyanathan et al. provide for a top-down document clustering approach wherein clustering is based on extracted features, derived from one or more tokens. U.S. Pat. No. 5,857,179, also by Vaithyanathan et al. provide for a computer method and apparatus for clustering documents and automatic generation of cluster keywords and further teach a document represented by an M dimensional vector wherein the vectors in turn are clustered.

U.S. Pat. No. 5,787,420 provides for a method of ordering document clusters without requiring knowledge of user interests. Tukey et al. teach a document cluster ordering based on similarity between clusters. U.S. Pat. No. 5,787,422, also by Tukey et al. provides for a method and apparatus for information access employing overlapping clusters and suggests document clustering based on a corpus of documents.

U.S. Pat. No. 5,864,855 provides for a parallel document clustering process wherein a document is converted to a vector and compared with clusters.

In addition, U.S. Pat. Nos. 5,873,056, 5,844,991, 5,442,778, 5,483,650, 5,625,767, and 5,808,615 provide general teachings relating to prior art document clustering methods.

An article by Rissanen et al. entitled, "Unsupervised Classification With Stochastic Complexity", published in the US/Japan Conference on the Frontiers of Statistical Modeling, 1992, discloses that postulating too many parameters leads to overfitting, thereby distorting the density of the underlying data.

An article by Kontkanen et al. entitled, "Comparing Bayesian Model Class Selection Criteria by Discrete Finite Mixtures", published in the Proceedings of the ISIS '96 Conference, suggests the difficulty in choosing an "optimal" order associated with clustering applications. An article by Smyth entitled, "Clustering Using Monte Carlo Cross-Validation", published in Knowledge Discovery in Databases, 1996, talks along the same lines of the reference by Kontkanen et al.

An article by Ghosh-Roy et al. entitled, "On-line Legal Aid: Markov Chain Model for Efficient Retrieval of Legal Documents", published in Image and Vision Computing, 1998, teaches data clustering and clustered searching.

An article by Chang et al. entitled, "Integrating Query Expansion and Conceptual Relevance, Feedback for Personalized Web Information Retrieval". Chang et al. suggest key word extraction for cluster digesting and query expansion.

All the prior art discussed above has addressed model selection from the point of view of estimating the optimal number of clusters. This art fails to consider clustering within different feature spaces. Whatever the precise merits, features, and advantages of the above cited references, none of them achieves or fulfills the purposes of the present invention. They fail to provide for considering the interplay of both the number of clusters and the feature subset in evaluating clustering models. Without this consideration, the prior art also fails to provide an objective method of comparing two models in different feature spaces.

SUMMARY OF THE INVENTION

The present invention provides for a system for model selection in unsupervised learning with applications to document clustering. The current system provides for a better model structure determination by determining both the optimal number of clusters and the optimal feature set.

The problem of model selection to determine both the optimal clusters and the optimal feature set is analyzed in a Bayesian statistical estimation framework and a solution is described via an objective function. The maximization of the said objective function corresponds to an optimal model structure. A closed-form expression for a document clustering problem and the heuristics that help find the optimum (or at least sub-optimum) objective function in terms of feature sets and the number of clusters are also developed.

BRIEF DESCRIPTION OF THE DRAWINGS

FIG. 2 illustrates the preferred method of selecting a subset of tokens.

DESCRIPTION OF THE PREFERRED EMBODIMENTS

Figure 1:
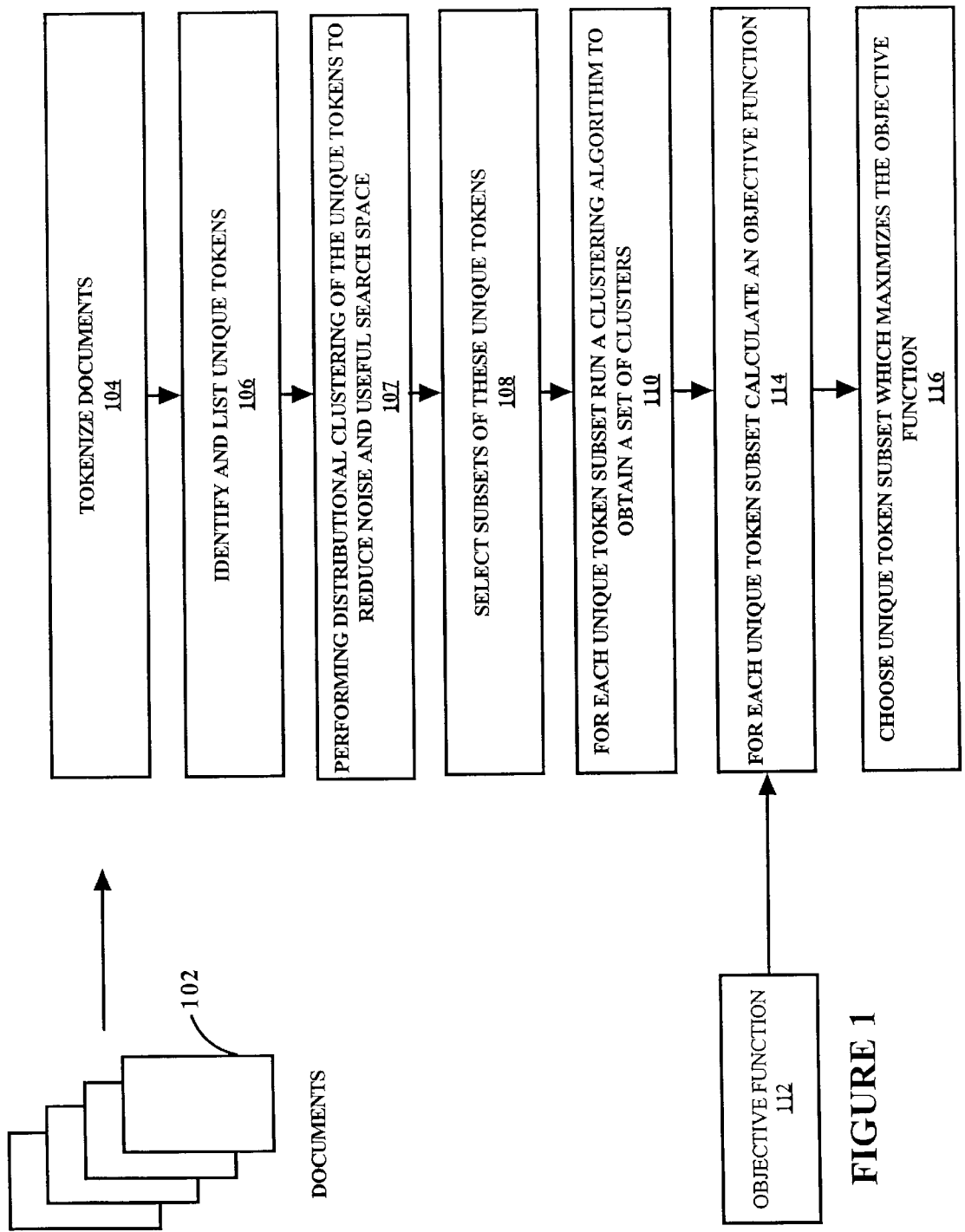
FIG. 1 illustrates a flowchart describing the invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications for its construction and is not intended to limit the invention to the embodiment illustrated. Those skilled in the art will envision many other possible variations within the scope of the present invention.

As stated previously, model selection approaches in clustering have primarily concentrated on the problem of determining the number of clusters. (or components). However, the optimal number of clusters is dependent on the feature space in which the clustering is performed. By including both the number of clusters and the feature set in the model selection problem, a new, problem is created—how are two models existing in different features spaces compared. The present invention provides an objective function for model selection in unsupervised learning that includes determining both the number of features and the number of components.

A preferred embodiment of the present invention is described herein with respect to document clustering. However, clustering other high dimensional data, such as image data, is also contemplated within the scope of the present invention.

The following describes a Bayesian approach to model selection for clustering:

Let D be a data set consisting of documents (or, in general, patterns) $\{d_1, d_2, \ldots d_n\}$. Furthermore, the documents are represented in a features space, T, that has a cardinality M. The present invention addresses the unsupervised learning problem of clustering D into clusters (or groups) such that the likelihood of D described by a certain probability model is maximized. Formally this is written as:

$$(\hat{\Omega}, \hat{\xi}) = \arg\max_{\Omega, \xi} P(D^T|\Omega, \xi) \quad (1)$$

where:

$D^T$ indicates the representation of the data in feature space T. It will be implicitly assumed that T consists of the complete set of features.

$\Omega$ is the structure model, and $\xi$ is the set of all parameter vectors.

NOTE:

1) The term "patterns" is used here to refer to the objects to be clustered. For example, the patterns we cluster can be documents.

2) This representation is usually a reduced representation constituting a loss of information from the complete representation.

The model structure, $\Omega$, consists of the number of clusters and the partitioning of the feature set. In a preferred embodiment, $\Omega$ also consists of the assignment of patterns (or documents) to clusters (hard clustering). Typically, parts of $\Omega$, such as the number of clusters, are fixed; if not, the present invention also contemplates regularization criterion more fully discussed below.

The maximization of the previous probability model (e.g. 1) constitutes a maximum-likelihood estimate of the model structure $\Omega$ and the parameter vector $\xi$. Such a maximization is accomplished using Estimation—Maximization (EM) algorithms as described by Dempster in the non-patent literature titled, Maximum Likelihood From Incomplete Data via the (EM) Algorithm, published in the Royal Journal of Statistical Society, Vol. 39., 1977.

Feature space T is separated into two sets U and N. N is the set of noise features and U is the set of useful features. With these sets in mind, the feature selection problem for clustering is defined as one of the identifying the optimal partition of T; into U and N, for a given number of clusters. With no other constraints, there are $2_M$ possible partitions.

One assumption is that the feature sets U and N are conditionally independent. Formally this means:

Assumption #1:

$$P(D^T|\Omega, \xi) = P(D^N|\Omega, \xi)P(D^U|\Omega, \xi)$$

where:

$D^N$ indicates data represented in the noise feature space
$D^U$ indicates data represented in the useful feature space
Using assumption 1, equation 1 can be rewritten $$(\hat{\Omega}, \hat{\xi}) = \arg\max_{\Omega, \xi} \{P(D^N|\Omega, \xi)P(D^U|\Omega, \xi)\} \quad (2)$$

A second assumption within the present invention is that the documents $\{d_1, d_2, \ldots, d_n\}$ are independent and identically distributed. This assumption means $$P(D^N|\Omega, \xi)P(D^U|\Omega, \xi) = \prod_{i=1}^{v} p(d_i^N|\xi^N)p(d_i^U|\xi_{k(i)}^U)$$

where $v$ is the number of documents in D $\xi_k^u$ is the parameter vector for the cluster k (it only applies to features in U)

$p(d_i^u)$ is the probability that the document i, given the parameter vector based on the assumption of some distribution. This is also called the likelihood function.

$k(i)$ is the cluster in which document i is assigned $p(d_i^u)$ is the probability of the pattern i given the parameter vector $\xi^N$.

Restricting the problem to only hard-clustering (i.e., every data point is a member of one and only one cluster) and using the second assumption, equation 2 can be rewritten as:

$$(\hat{\Omega}, \hat{\xi}) = \arg\max\left\{\prod_{i=1}^{v} p(d_i^N|\xi^N) \cdot p(d_i^U|\xi_{k(i)}^U)\right\} \quad (3)$$

One aspect to notice is that an explicit dependence on $\Omega$ has been removed, but it is still implicit in k(i) and the partitioning of T into N and U. Another way to write equation 3 is:

$$(\hat{\Omega}, \hat{\xi}) = \arg\max\left\{\prod_{i=1}^{v} p(d_i^N|\xi^N) \cdot \prod_{k=1}^{K} \prod_{j \in D_k} p(d_i^U|\xi_k^U)\right\} \quad (4)$$

where

K is the number of clusters $j \in D_k$ is the notation which denotes document j is assigned to cluster k One shortcoming of equation 4 is that it is not regularized which essentially means that, since there is no penalization for more complex models, attempts to optimize it directly have a possibility of the set N becoming empty. To overcome this problem, the present invention contemplates using "marginal or integrated likelihoods" to provide regularization, as described by Bernardo in his book titled, Bayesian theory, published by Wiley, 1994. The non-patent literature to Rissanen et al. titled, Stochastic Complexity, published in World Scientific, 1989, wherein "stochastic complexity" is the negative logarithm of the "marginal or integrated likelihood" method described by Bernardo.

By assuming that all parameter vectors are independent, i.e., $$\pi(\xi) = \pi(\xi^N) \cdot \prod_{k=1}^{K} \pi(\xi_k^U)$$

the marginal likelihood can be written as (using assumption 3):

$$p(D^T | \Omega) = \int_{\Xi^N} \left\| \prod_{i=1}^{\nu} p(d_i^N | \xi^N) \cdot \pi(\xi^N) d\xi^N \cdot \right. \quad (5)$$

$$\prod_{k=1}^{K} \int_{\Xi^N} \left\| \prod_{i \in D_k} p(d_i^U | \xi_k^U) \cdot \pi(\xi_k^U) d\xi_k^U \right.$$

where:

$\pi(\xi^N)$ prior distribution over the noise-feature parameters, $\pi(\xi_k^U)$ prior distribution over the useful-feature parameters, $\Xi^N, \Xi^U$ integral limits appropriate to the particular parameter spaces. These will be omitted to simplify the notation.

Within this last equation, for a fixed number of clusters, k, increasing the cardinality of U increases the model complexity. Similarly, for a fixed set U, increasing the clusters K also increase the model complexity. The book by Bishop titled, "Neural Networks for Pattern Recognition", published by Oxford University Press, 1996, provides for a general insight into the use of marginal likelihoods for regularization.

The formulation of the problem as equation 5, leads to a search problem that is computationally very expensive. Given a data set of 10,000 features, finding between 5 and 10 clusters requires an evaluation of $v^j \cdot 2^{10,000}$. Using the EM algorithm allows avoidance of explicitly evaluation all the $v^i$ pattern-to-cluster partitions but some heuristic is clearly required to reduce the number of feature partitions. Such a heuristic is discussed in detail in the coming sections.

If closed-form solutions for the integrals in equations 5 are not available, however, it can be optimized using computationally intensive Markov Chain Monte Carlo (MCMC) simulations. Other well-studied asymptotic approximations are also available. In one particular embodiment; the BIC approximation by Schwarz described in his paper titled, "Estimation the Dimension of a Model", published in the Annals of Statistics, Vol. 6, 1978, provides for estimating the dimension of a model. Applying this approximation to equation 5 and simplifying:

$$P(D | \Omega) = \sum_{i} \log p(d_i^N | \tilde{\xi}^N) - \frac{|\xi^N|}{2} \log v + \quad (6)$$

$$\sum_{k} \left( \sum_{j \in D_k} \log p(d_j^U | \tilde{\xi}_k^U) - \frac{|\xi_k^N|}{2} \log v_k \right)$$

Where:

$|\xi^N|$ number of free parameters in the "noise features"

$|\xi_k^U|$ number of free parameters in the "useful features" in cluster $k$ $v_k$ number of patterns in the $k^{th}$ cluster, and $\tilde{\xi}_k^U, \tilde{\xi}^N$ are the maximum likelihood estimated for and respectively.

The approximation described above is identical to the original asymptotic approximation of minimum length description (MDL) as described by Risannen in the article titled, "Modeling by Shortest Data Description", published in Automatica, Vol. 14. It should be noted that the BIC/MDL approximations are based on an asymptotic analysis, i.e., $v \to \infty$. It should however be noted that as the feature set gets large, i.e., as the number of documents gets large, such approximations can lead to problems.

Document clustering algorithms typically start by representing a document as a "bag-of-words" in a vector representation called the vector-space model. The clustering algorithms of the prior art perform operations on these vectors. The features in this vector-space model number into the tens of thousands and are typically single words or noun phrases. The prior art includes feature selection in supervised text classification, but the present invention applies feature selection to unsupervised learning (or document clustering). Once the feature dimensionality is reduce, the documents are then clustered into an arbitrary number of clusters.

Within supervised and partially supervised learning, multinomial models of text generation have proven successful. Similarly, for the present invention, a multinomial model for $p(d_i^u / \xi_k^u)$ and $p(d_i^N / \xi)$ is used in which term counts are used as the feature representation. By selecting this model, another parameter indicating the probability of the N and U split is introduced into the problem analysis. Essentially, a generation model is assumed where the number of useful terms for each document is determined by a probability $\theta^s$ and then the terms in the document are drawn with a probability $\theta^n$ or $\theta_k^U$ that is independent of any of the other terms in the document, including other instances of the same term.

For documents modeled using such a multinomial distribution, the second term of equation 5 can be written:

$$p(d_i^U | \theta_k^U) = \binom{t_i^U}{t_{i,u} | u \in U} \prod_{u \in U} (\theta_k^U)^{t_{i,u}} \quad (7)$$

where $$\binom{\cdots}{\{\cdots\}}$$

is the multinomial coefficient $t_{i,u}$ and is the number of occurrences of term (or feature) u in document (pattern) i, $t_i^u$ is the total number of all features in the document and is computed as $\Sigma_u t_{i,u}$ Similarly, the first term in equation 5 can be written:

$$p(d_i^N | \theta^N) = \binom{t_i^N}{t_{i,n} | n \in N} \prod_{n \in N} (\theta^n)^{t_{i,n}} \quad (8)$$

where $t_i^N$ and $t_{i,n}$ are the corresponding counts for noise features.

The split probability which results is modeled as a binomial distribution, and written as:

$$P(S | \hat{\theta}^S) = \binom{t^N + t^U}{t^N} (\theta^S)^{t^N} (1 - \theta^S)^{t^U} \quad (9)$$

where $$\binom{n}{k} = \left( \frac{n!}{k!(n-k)!} \right)$$

Simplifying equation 5 with the substitutions of equations 7, 8 and 9, the equation becomes:

$$P(D\mid\Omega) = \binom{t^N + t^U}{t^N} \int [(\theta^S)^{t^N}(1-\theta^S)^{t^U}]\pi(\theta^S)d\theta^S. \quad (10)$$

$$\left\| \prod_{k=1}^{K} \prod_{i=D_k} \binom{t_i^U}{\{t_{i,u}\mid u \in U\}} \right\| \int \left\| \prod_{u \in U} (\theta_k^u)^{t_{i,u}} \right\| \pi(\theta_k^U) d\theta_k^U.$$

$$\left\| \prod_{j=1}^{v} \binom{t_i^N}{t_{j,n}\mid n \in N} \right\| \int \left\| \prod_{n \in N} (\theta^n)^{t_{j,n}} \right\| \pi(\theta^N) d\theta^N$$

Even with this form of the equation, a form for the prior distribution of the parameters must be chosen. Because both the noise and useful features are represented using a multinomial form, an identical form is chosen for the priors of both parameter sets. In particular, the Beta family is a conjugate to the Binomial family and therefore the Dirichlet (multiple Beta) distribution is chosen as the form of the prior for both $\Pi(\theta_k^u)$ and $\Pi(\theta^n)$. Also, the Beta distribution is chosen as the form of the prior for $\Pi(\theta^s)$.

Substituting the Dirichlet and the Beta form for the priors into equation 10 and simplifying provides a final form of the marginal likelihood of the entire data set:

$$P(D\mid\Omega) = \left\| \frac{\Gamma(\gamma_a + \gamma_b)}{\Gamma(\gamma_a)\Gamma(\gamma_b)} \frac{\Gamma(t^N + \gamma_a)\Gamma(t^U + \gamma_b)}{\Gamma(t^U + t^N + \gamma_a + \gamma_b)} \right\| \quad (11)$$

$$\left\| \frac{\Gamma(\beta)}{\Gamma(\beta + t^N)} \prod_{n \in N} \frac{\Gamma(\beta_n + t^n)}{\Gamma(\beta_n)} \right\| \left\| \frac{\Gamma(\sigma)}{\Gamma(\sigma + v)} \prod_{k=1}^{K} \frac{(\sigma_k + \mid D_k \mid)}{\Gamma(\mid D_k \mid)} \right\|.$$

$$\left\| \prod_{k=1}^{K} \frac{\Gamma(\alpha)}{\Gamma(\alpha + t^{U(k)})} \prod_{u \in U} \frac{\Gamma(\alpha_u + t_k^u)}{\Gamma(\alpha_u)} \right\|$$

where: $\beta_n$ and $\alpha_u$ are the hyper-parameters of the Dirichlet prior for noise and useful features, respectively;

$\beta = \Sigma \beta_n$, $\alpha = \Sigma \alpha_u$, $\sigma = \Sigma \sigma_k$, and $\Gamma()$ is the "gamma" function;

$\gamma_a$, $\gamma_b$ are the hyper parameters of the Betaprior for the split probability;

$\mid D_k \mid$ is the number of documents in cluster k, and $t^{u(k)}$ is computed as $\Sigma t_i^U$ Equation 11 represents an objective function that is used to evaluate feature subsets in unsupervised learning. In a preferred embodiment of the present invention, the NLML of the value obtained in equation 11 is used for comparison. NLML stands for "Negative Log Marginal Likelihood". Also, while the present invention contemplates other non-informative Dirichlet priors known in the art, a preferred embodiment sets, $\beta_i$, $\alpha_i$, $\gamma_a$, $\gamma_b$ all equal to 1.

As noted previously, for a feature-set of size M, there are $2_M$ partitions and even for a small number of documents analyzing these partitions is computationally unfeasible. Therefore, the following heuristic method is used to obtain a subset of features which are used in the "bag-of-words" model to cluster documents.

A good feature subset for document clustering needs to consist primarily of content-bearing terms. The task of feature subset selection is therefore redefined as one of identifying content-bearing terms for the corpus of documents under consideration. The present invention uses a distributional clustering (DC) scheme based on a simple non-parametric density estimation algorithm to identify such content (or topical) terms. Functional terms and topical terms exhibit different distributions across a corpus of documents. Therefore, clustering terms is useful in identifying groups of topical terms. As a result, distributional clustering reduces (via a reducer) the search space for feature selection from $2_M$ to $2_C$, where C is the number of clusters produced by the DC algorithm. Note that terms in a cluster do not necessarily have any semantic relationship, they simply have similar distributions across the documents.

In a preferred embodiment, a simple non-parametric density estimation scheme is utilized. A histogram is computed for each feature, the first bin consists of the number of documents with zero occurrences of the feature, the second bin is the number of documents with a simple occurrence of the feature, and the third bin is the number of documents with two or more occurrences of the feature.

A measure of similarity is needed in order to cluster the histograms generated for each feature. Once such measure known in the art is the relative entropy or K—L distance $\Delta(.\|.)$. In this measure, for two terms with probability distributions $p_1(.)$ and $p_2(.)$, the measure is given by:

$$\Lambda(p_1(t)\|p_2(t)) = \sum_t p_1(t)\log\frac{p_1(t)}{p_2(t)} \quad (12)$$

Equation 12 is taken over the three bins corresponding to counts 0, 1 and $\geq 2$. The distance between two individual terms is never actually computed. Rather, during the assignment-to-clusters step of k-means $\Delta(p_w\|p_{ck})$ is a minimum.

Furthermore, the present invention can be extended to improve search results for a given search engine. The present invention provides a method to select and evaluate model structures in unsupervised learning (or clustering). First, an objective function is derived which treats optimal model selection as choosing both the number of clusters and the feature subset within the model structure. By making some assumptions about the particular clustering problem, the closed-form solution of the objective function is then derived. Finally, in order to make feasible the optimization problem associated with this objective function, a distributional-clustering heuristic is presented which identifies good feature subsets. A generalized description of the present invention is pictorially shown in FIG. 1 and is discussed below.

FIG. 1 illustrates a flowchart depicting the logical flow of the present invention. Documents 102 are tokenized 104 using well known methods in the art (e.g., via a tokenizer). These methods allow a list of unique tokens to be generated in step 106.

In the terminology of the previous explanation of a preferred embodiment describing document clustering, this list of tokens is essentially the features of the feature-space. In step 107, distributional clustering of the unique tokens is performed to reduce noise and useful search space. Next, in step 108, subsets of these features are selected (via a selector) and a clustering algorithm is then run, in step 110, to produce a set of clusters for each such subset (via the above-mentioned clustering method or clustering mechanism). An objective function 112 is then calculated (via a processing mechanism comprising computer code to calculate the objective function) in step 114 for each unique token subset selected in step 108. In a preferred embodiment, the objective function is given earlier in equation 11. Finally, the unique token subset which maximizes the objective function calculated in step 114 is selected 116 as the optimal model for documents 102.

FIG. 2 illustrates a preferred method of performing step 108. For computation feasibility, only a subset of features are selected rather than all the features (or tokens) identified in the documents. For each token, a non-parametric density estimation is calculated in step 202. Next, in step 204, these estimations are clustered using a relative entropy distance measure. Equation 12, provided earlier, is an example of such a measure. If n features are thus clustered into c clusters, then rather than $2^n$ subsets being analyzed only $2^c$ subsets need to be analyzed. This reduction is significant because c<<n.

The above system and its described functional elements are implemented in various computing environments. For example, the present invention may be implemented on a conventional IBM PC or equivalent, multi-nodal system (e.g. LAN) or networking system (e.g. Internet, WWW). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of model selection for unsupervised learning.

CONCLUSION

A system and method has been shown in the above embodiments for the effective implementation of a generalized model for unsupervised learning with applications in document clustering. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware. In addition, the specific examples of clustered data are representative of the preferred embodiment and should not limit the scope of the invention. Those skilled in the art will envision many other possibilities wherein the same system can be extended to other data sets such as image, voice, etc.

What is claimed is:

1. A computer-based method for optimal clustering of data, said data retained with computer storage, said method comprising the steps:

tokenizing a data set;

identifying unique tokens in said tokenized data set;

performing distributional clustering of said unique tokens to reduce noise and useful search space and identifying one or more subsets of said unique tokens;

selecting said identified one or more subsets and calculating an objective function value for each of said selected subsets, said calculation based upon varying number of clusters over a predetermined range, and for each number of clusters, cluster said data by a clustering algorithm to form data clusters;

choosing among said subsets the one that maximizes said objective function value, and wherein an optimal model for clustering said data is obtained by simultaneously determining optimal values for: the number of clusters, the token subset, and the data clusters, whereby said optimal values taken together, maximizes said objective function value.

2. A computer-based method for optimal clustering of data, said data retained with computer storage, as per claim 1, wherein said data set comprises a collection of documents, said documents retained locally or remotely in computer storage.

3. A computer-based method for optimal clustering of data, said data retained with computer storage, as per claim 1, wherein said data set is a voice or image data set, said voice or image data set stored locally or remotely in computer storage.

4. A computer-based method for optimal clustering of data, said data retained with computer storage, as per claim 3, wherein said data stored remotely includes data stored across networks.

5. A computer-based method for optimal clustering of data, said data retained with computer storage, as per claim 4, wherein said networks include Internet, LANs, or Web-based networks.

6. A computer-based method for optimal clustering of data, said data retained with computer storage, as per claim 1, wherein said step of selecting a subset of tokens comprises:

computing the number of documents which each said token appears in, and performing estimations of clusters using a relative entropy distance measure.

7. A computer-based method of selecting a model for optimal clustering of data, said data retained with computer storage, as per claim 1, wherein said step of identifying unique tokens is implemented via a distributed clustering heuristic method.

8. A computer-based method of selecting a model for optimal clustering of data, said data retained with computer storage, as per claim 7, wherein said distributed heuristic clustering heuristic method is based on non-parametric density estimation.

9. A computer-based method of selecting a model for optimal clustering of data, said data retained with computer storage, as per claim 1, wherein said objective function is a Bayesian function.

10. A computer-based method of selecting a model for unsupervised learning comprising the steps:

generating a list of features within a data set;

selecting a plurality of subsets of said list of features; for each of said plurality of subsets, performing the following steps:

performing clustering of data sets;

evaluating an objective function, wherein said objective function depends on both one of said plurality of subsets and a result of clustering based on said one subset, and identifying an optimal subset of said plurality of subsets which maximizes said objective function.

11. A computer-based method of selecting a model for unsupervised learning, as per claim 10, wherein said selecting a plurality of subsets of said list of features further comprises the steps:

for each feature in said list of features, computing a density estimation within said data list;

clustering said density estimation, and wherein a resulting number of clusters is much smaller than a cardinality of said list of features.

12. A computer-based system for processing a collection of electronic documents, said electronic documents located local to said computer or located remotely across computer networks, said system comprising:

a tokenizer to identify a list of features within said electronic documents;

a selector to select a plurality of subsets of said identified features;

a reducer to reduce said selected subsets based on a density estimation;

a cluster mechanism to cluster documents for each of said selected subsets;

a processing mechanism to evaluate a Bayesian function of said selected subsets, and wherein a model for optimizing clustering of said electronic documents is based both on the number of clusters and the subsets selected.

13. A computer-based system for processing a collection of electronic documents, said electronic documents located local to said computer or located remotely across computer networks, as per claim 12, wherein said electronic documents are located on the world wide web and said model for optimizing clustering improves search results for an associated search engine.

14. A computer-based system for processing a collection of electronic documents, said electronic documents located local to said computer or located remotely across computer networks, as per claim 12, wherein said reducer implements a distributional clustering heuristic algorithm.

15. A computer-based system for processing a collection of electronic documents, said electronic documents located local to said computer or located remotely across computer networks, as per claim 14, wherein said distributed clustering heuristic algorithm is based on a non-parametric density estimation.

16. A computer-based system for processing a collection of electronic documents, said electronic documents located local to said computer or located remotely across computer networks, as per claim 15, wherein said non-parametric density estimation implements a computed histogram using a relative entropy algorithm.

17. A computer-based system for processing a collection of electronic documents, said electronic documents located local to said computer or located remotely across computer networks, as per claim 16, wherein said relative entropy algorithm comprises a K—L distance algorithm.

18. An article of manufacture comprising a computer useable medium having computer readable code embodied therein which selects a model for unsupervised learning, said computer readable code comprising:

computer readable program code generating a tokenized data set;

computer readable program code identifying all unique features or tokens in said tokenized data set;

computer readable program code selecting a subset of said tokens;

computer readable program code running an EM algorithm for each said selected subset;

computer readable program code calculating an objective function for each said selected subset, and computer readable program code choosing among said subsets the one that optimizes the objective function.

* * * * *